(12) United States Patent
Wu et al.

(10) Patent No.: US 8,388,014 B2
(45) Date of Patent: Mar. 5, 2013

(54) FOLDABLE MOTORIZED VEHICLE WITH FRAME CONNECTING AND FRAME LOCKING MECHANISMS

(75) Inventors: Chichun Wu, Dongguan (CN); Zhao Zhang, Dongguan (CN)

(73) Assignee: Chichun Wu, Dongguan, Guangdong Province (CN)

( * ) Notice: Subject to any disclaimer, the term of this patent is extended or adjusted under 35 U.S.C. 154(b) by 68 days.

(21) Appl. No.: 13/233,999

(22) Filed: Sep. 15, 2011

(65) Prior Publication Data

US 2012/0193891 A1    Aug. 2, 2012

(30) Foreign Application Priority Data

Jan. 28, 2011 (CN) .................. 2011 2 0029857 U
Jan. 28, 2011 (CN) .................. 2011 2 0029860 U
Mar. 21, 2011 (CN) .................. 2011 2 0074817 U

(51) Int. Cl.
*B62B 1/12* (2006.01)
*B62D 61/00* (2006.01)

(52) U.S. Cl. ................. 280/638; 280/639; 180/208

(58) Field of Classification Search ......... 280/638–639, 280/647, 650; 180/208, 250.1; 297/344.16–344.17, 297/344.15, 341, 15, 65
See application file for complete search history.

(56) References Cited

U.S. PATENT DOCUMENTS

| | | | | |
|---|---|---|---|---|
| 6,371,235 | B1 * | 4/2002 | Wisecarver | 180/208 |
| 7,703,567 | B2 * | 4/2010 | Wang | 180/208 |
| 7,793,949 | B2 * | 9/2010 | Wang | 280/37 |
| 7,950,686 | B2 * | 5/2011 | Wang | 280/643 |
| 2005/0173878 | A1 * | 8/2005 | Espejo | 280/47.34 |
| 2009/0115167 | A1 * | 5/2009 | Chin et al. | 280/639 |
| 2010/0126789 | A1 * | 5/2010 | Scragg | 180/208 |
| 2012/0193886 | A1 * | 8/2012 | Wu et al. | 280/124.111 |

* cited by examiner

*Primary Examiner* — John Walters
*Assistant Examiner* — James Triggs
(74) *Attorney, Agent, or Firm* — Morris Manning & Martin LLP; Tim Tingkang Xia, Esq.

(57) ABSTRACT

A foldable motorized vehicle includes a frame connecting mechanism and a frame locking mechanism. The frame connecting mechanism comprises: a pair of first slide rails, a pair of second slide rails, a pair of first connecting members, and a pair of second connecting members. The front end portions of the first slide rails are fixedly connected to a front frame, the rear end portion of the second slide rails are fixedly connected to a rear frame. The front end portions of the second slide rails are supported on the rear end portions of the first slide rails, creating a slidable connection between the first slide rails and the second slide rails with the first connecting members and the second connecting members. The frame locking mechanism comprises a handle, a cable tube, a cable, a mounting base, a compression spring, and a stopper.

19 Claims, 12 Drawing Sheets

FOLDABLE MOTORIZED VEHICLE WITH FRAME CONNECTING AND FRAME LOCKING MECHANISMS

CROSS-REFERENCE TO RELATED APPLICATIONS

This application claims priority to and benefit of, pursuant to 35 U.S.C. §119(a), Chinese Patent Application No. 201120029857.8, filed Jan. 28, 2011, Chinese Patent Application No. 201120029860.X, filed Jan. 28, 2011, and Chinese Patent Application No. 201120074817.5, filed Mar. 21, 2011. Each of the above applications is incorporated by reference herein in its entirety.

FIELD OF THE INVENTION

The present invention generally relates to a vehicle, and more particularly to a foldable motorized vehicle having a frame connecting mechanism and a locking mechanism.

BACKGROUND OF THE INVENTION

With the improvement of living standards, the life philosophy of being distinctive, fashionable, healthy, and environmentally friendly becomes popular, and fashionable and environmentally friendly articles for daily use and motorized vehicles are favored by more and more people. The Motorized Vehicles evolve from being only a means of transport to being a symbol of a fashionable and healthy lifestyle, and are a means for practicing environmental protection. Foldable Motorized Vehicle saves storage room and is easy to carry. The actual size of a folded motorized vehicle is dramatically reduced, making it possible to carry it up and down stairs, into and out of an elevator, into a bus or metro train. Furthermore, the Foldable Motorized Vehicle has a good appearance, and shows exquisite workmanship, thereby making it top choice of fashionable people.

However, in a conventional foldable vehicle, building a foldable frame is the key to making a functional foldable motorized vehicle. The foldable frame has a complex structure, making both folding and unfolding complicated and slow. The foldable frame should be designed so that after the frame is folded, the motorized vehicle is compact, small in size, light in weight, and strong enough to sustain folding and unfolding actions. Therefore, a novel foldable frame structure that is convenient to fold and unfold, of a more compact structure after being folded, small in size, light in weight, and convenient to carry becomes a new direction of research.

Therefore, a heretofore unaddressed need exists in the art to address the aforementioned deficiencies and inadequacies.

SUMMARY OF THE INVENTION

The present invention provides a foldable frame with a novel frame connecting mechanism and a frame locking mechanism that has a simple yet novel structure, which is convenient to fold and unfold.

In one aspect, the present invention relates to a frame connecting mechanism for connecting a front frame and a rear frame of a foldable motorized vehicle. In one embodiment, the frame connecting mechanism includes a pair of first slide rails, each having a front end portion and a rear end portion; a pair of second slide rails, each having a front end portion and a rear end portion; a pair of first connecting members, each having a first end and a second end; and a pair of second connecting members, each having a first end and a second end.

The front end portions of the pair of the first slide rails are fixedly connected to the front frame, the rear end portion of the second slide rails are fixedly connected to the rear frame, the front end portions of the second slide rails are supported on the rear end portions of the first slide rails, the first ends of the first connecting members are fixedly connected respectively to the corresponding rear end portions of the pair of the first slide rails, the second ends of the first connecting members are slideably connected respectively to the pair of the second slide rails, a first end of the second connecting members are fixedly connected to the front end portions of the pair of the second slide rails, and the second ends of the second connecting members are slideably connected respectively to the pair of the first slide rails, to form a slidable connection between the pair of the first slide rails and the pair of the second slide rails with the pair of the first connecting members and the pair of the second connecting members.

In one embodiment, the pair of the first slide rails comprise an upper end surface and a lower end surface forming a first slide slot therebetween, and the pair of the second slide rails comprise an upper end surface and a lower end surface forming a second slide slot therebetween.

In one embodiment, each of the first connecting members comprises a connecting plate, a sliding block and a fixture block. The sliding block is slideably connected to the second slide rails. The fixture block is fitted to the rear end portion of the first slide rails. The second slide rails are supported by the first slide rails, respectively. The sliding block and the fixture blocks are held by the first slide slot, and the connecting plate is fixedly connected to the sliding block and the fixture block respectively.

In one embodiment, each of the second connecting members comprises a connecting plate, a sliding block and a fixture block. The sliding block is slideably connected to the first slide rails, the fixture block is fitted to the front end portion of the second slide rails, and the sliding block and the fixture block are held by the second slide slot, and the connecting plate of the second connecting members are fixedly connected to the sliding block and the fixture block respectively.

In one embodiment, the sliding block is formed with a plurality of installation holes for mounting the sliding block to the connecting plate, and a sliding surface. The fixture block further includes a plurality of installation holes for mounting the fixture block to the connecting plate, and a stopping slot. The connecting plate further has a plurality of installation holes for mounting the sliding block to the connecting plate, and a plurality of installation holes and a mounting surface for mounting the fixture block to the connecting plate.

In one embodiment, the sliding block of the pair of the first connecting members are fitted in the second slide slot of the pair of the second slide rails, and the sliding block of the pair of the second connecting members are fitted in the first slide slot of the pair of the first slide rails, respectively.

In one embodiment, the frame connecting mechanism further has a frame locking mechanism. The frame locking mechanism is mounted on the first connecting members, and the frame locking mechanism is adapted for locking the first slide rails and the second slide rails, respectively.

In another aspect, the present invention relates to a frame locking mechanism for locking a first slide rail and a second slide rail of a foldable motorized vehicle. In one embodiment, the frame locking mechanism has a handle; a cable tube; a cable installed inside of the cable tube, wherein a first end of the cable is connected to the handle, and a second end of the cable includes a cylindrical metal bar; a mounting base having a upper and lower clamping pieces that respectively extend from upper and lower ends of the mounting base, and an upper through hole and a lower though hole each with an opening; a compression spring; and a stopper having a rounded tip locking pillar, a stopping flange along the perimeter of the stopper, a sleeve pillar with a accommodation cavity and an accommodation slot.

In use the cable tube is mounted on the first slide rail of the foldable motorized vehicle, the second slide rail is slidably connected to the first slide rail, the mounting base is mounted on the first slide rail, the second slide rail includes a plurality of locking holes, the rounded tip of the stopper passes through the upper through hole of the mounting base and extends into the locking hole of the second slide rail, the stopping protrusion of the stopper urges against an upper end of the compression spring, a lower end of the compression spring urges against the lower clamping piece, the cylindrical metal bar of the second end of the cable is fitted in the round hole and through the opening slot of the stopper, and the first end of the cable passes through the compression spring and the cable tube and is connected to the handle, and wherein when the handle is pulled, the stopper is driven by the handle to exit the locking hole.

In one embodiment, the frame locking mechanisms are disposed on two sides of a front frame respectively, and the cables are connected to the handle at the same time, and the pulling the handle releases the frame locking mechanism such that the second slide rail can slide against the first slide rail.

In one embodiment, a first sliding slot is opened on one side of the first slide rail, and a second sliding slot is opened on one side of the second slide rail. The first slide rail is mounted with a first connecting member, the second slide rail is mounted with a second connecting member. Each of the first connecting member and the second connecting member comprises a connecting plate, a sliding block and a fixture block. The sliding block of the first connecting member is slideably connected to the second slide rail through the second sliding slot, and the fixture block of the first connecting member is fitted to a rear end portion of the first slide rail. The sliding block of the second connecting member is slideably connected to the first slide rail through the first sliding slot, and the fixture block of the second connecting member is fitted to a front end portion of the second slide rail, respectively, such that the first slide rail and the second slide rail can slide against each.

In one embodiment, the mounting base is mounted on the first connecting member. The rounded tip locking pillar passes through the upper through hole of the mounting base and extends into a locking hole of the second slide rail. One end of the compression spring is sleeved on the sleeve pillar and pushes against one side of the stopping flange, and the other end of the compression spring is placed on the inside surface of the lower clamping piece. The other side of the stopping flange pushes against the upper clamping piece.

In one embodiment, the sleeve pillar of the stopper has an accommodation cavity for accommodating the cylindrical metal bar of the cable, and an accommodation slot for the cable to pass through, and the accommodation cavity is in communication with the accommodation slot. The accommodation cavity is a round through hole, and the accommodation slot is a U-shaped slot.

In one embodiment, the lower clamping piece of the mounting base is further disposed with an opening, and the opening is in communication with the lower through hole of the mounting base.

In yet another aspect, the present invention relates to a foldable motorized vehicle comprising the frame locking mechanism and/or the frame connecting mechanism, as disclosed above.

In a further aspect, the present invention relates to a foldable motorized vehicle. In one embodiment, the foldable motorized vehicle has a front frame; a rear frame; and a frame connecting mechanism for connecting the front frame and the rear frame. The frame connecting mechanism includes a pair of first slide rails, each having a front end portion and a rear end portion; a pair of second slide rails, each having a front end portion and a rear end portion; a pair of first connecting members, each having a first end and a second end; and a pair of second connecting members, each having a first end and a second end.

The front end portions of the pair of the first slide rails are fixedly connected to the front frame, the rear end portion of the second slide rails are fixedly connected to the rear frame, the front end portions of the second slide rails are supported on the rear end portions of the first slide rails, the first ends of the first connecting members are fixedly connected respectively to the rear end portions of the pair of the first slide rails, the second ends of the first connecting members are slideably connected respectively to the pair of the second slide rails, the first ends of the second connecting members are fixedly connected respectively to the front end portions of the pair of the second slide rails, the second ends of the second connecting members are slideably connected respectively to the pair of the first slide rails, to form a slidable connection between the pair of the first slide rails and the pair of the second slide rails with the pair of the first connecting members and the pair of the second connecting members.

Further, the foldable motorized vehicle includes a frame locking mechanism for locking the pair of the first slide rails and the pair of the second slide rails, respectively. The frame locking mechanism has a handle; a cable tube; a cable installed inside of the cable tube, wherein a first end of the cable is connected to the handle, and a second end of the cable includes a cylindrical metal bar; a mounting base having a upper and lower clamping pieces that respectively extend from upper and lower ends of the mounting base, and an upper through hole and a lower though hole each with an opening; a compression spring; and a stopper having a rounded tip locking pillar, a stopping flange along the perimeter of the stopper, a sleeve pillar with a accommodation cavity and an accommodation slot.

In use the cable tube is mounted on the first slide rail of the foldable motorized vehicle, the second slide rail is slidably connected to the first slide rail, the mounting base is mounted on the first slide rail, the second slide rail includes a plurality of locking holes, the rounded tip of the stopper passes through the upper through hole of the mounting base and extends into the locking hole of the second slide rail, the stopping protrusion of the stopper urges against an upper end of the compression spring, a lower end of the compression spring urges against the lower clamping piece, the cylindrical metal bar of the second end of the cable is fitted in the round hole and through the opening slot of the stopper, and the first end of the cable passes through the compression spring and the cable tube and is connected to the handle, and wherein when the handle is pulled, the stopper is driven by the handle to exit the locking hole.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE INVENTION

Figure 1:
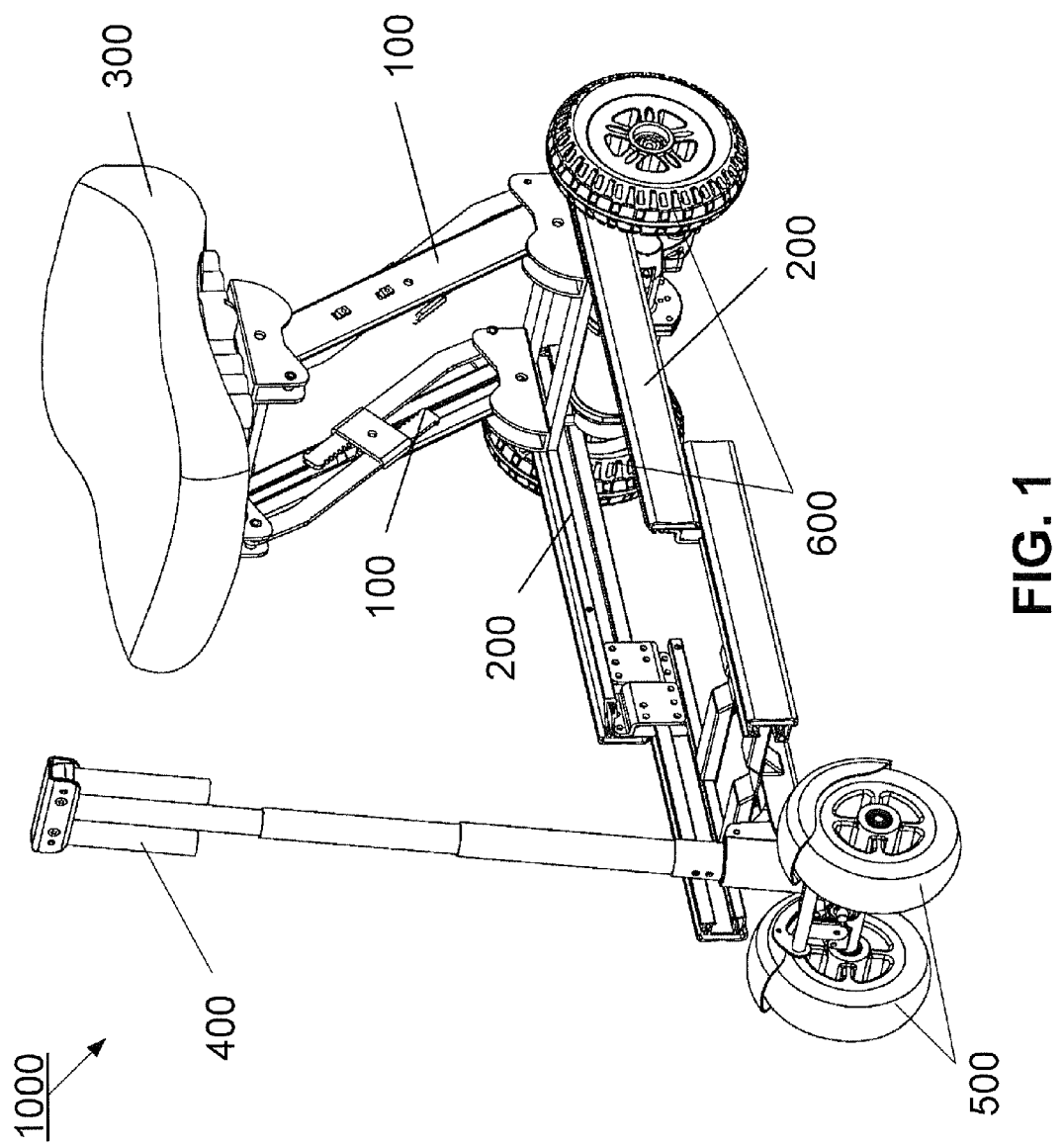
FIG. 1 shows a perspective view of an exemplary foldable motorized vehicle with a frame connecting and locking mechanism according to one embodiment of the present invention.
Figure 2:
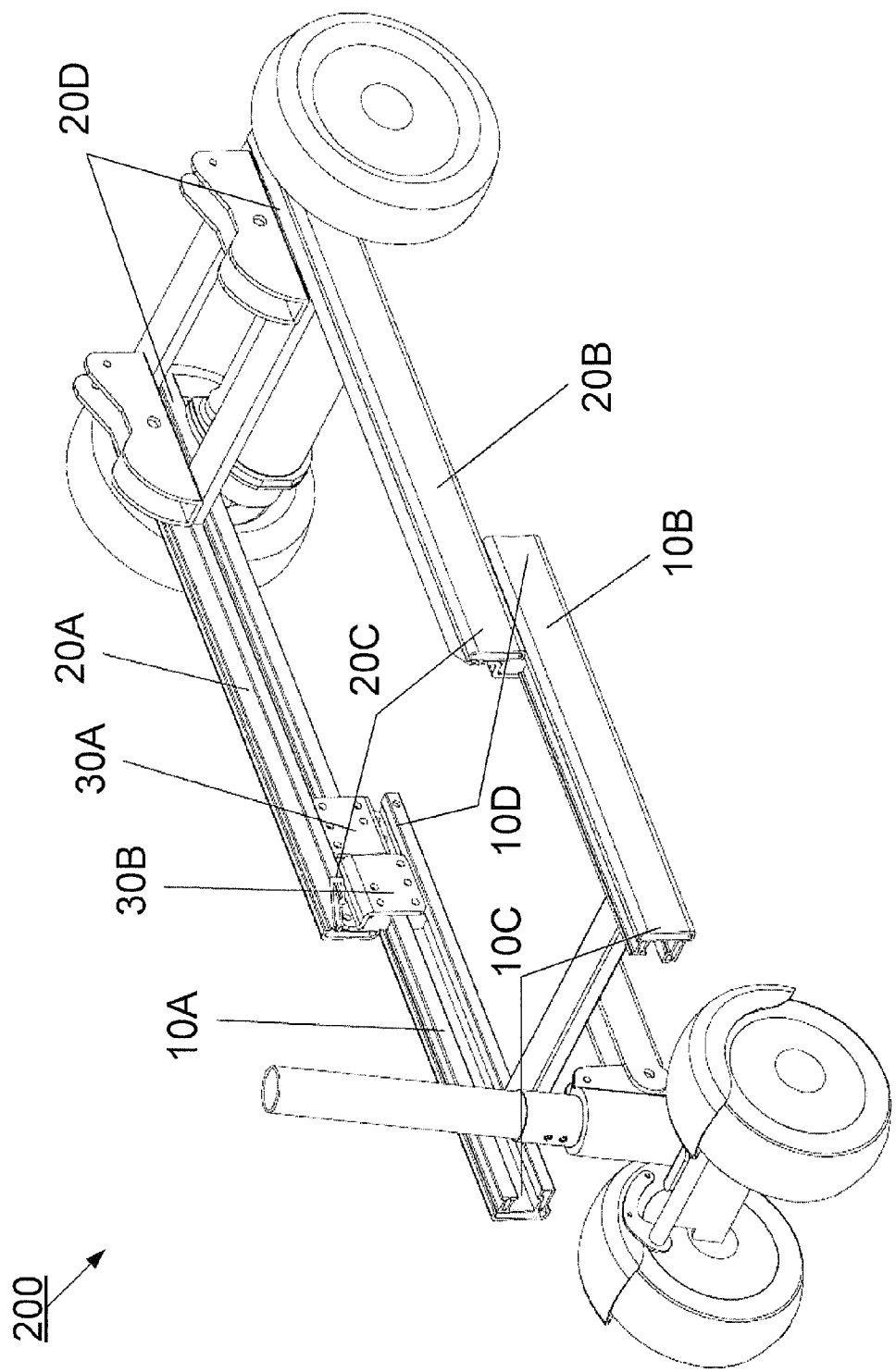
FIG. 2 shows a perspective view of the frame connecting and locking mechanism for the foldable motorized vehicle according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Prior to a detailed description of the present invention(s), the following definitions are provided as an aid to understanding the subject matter and terminology of aspects of the present invention(s), and not necessarily limiting of the present invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Embodiments of the present invention are described below with reference to the accompanying drawings, and in the accompanying drawings like reference numerals represent like elements.

In FIG. 1, a perspective view of an exemplary foldable motorized vehicle 1000 with a frame connecting and locking mechanism according to one embodiment of the present invention is shown. The foldable motorized vehicle 1 includes: (a) a foldable seating mechanism 100, (b) a foldable connecting mechanism 200, (c) a foldable seat 300, (d) a foldable steering mechanism 400, (e) a pair of front wheels 500, and (f) a pair of rear wheels 600. As shown in FIG. 1 to FIG. 4, a frame connecting mechanism 200 according to the present invention is applicable to connecting a front frame and a rear frame of a foldable motorized vehicle. The frame connecting mechanism 1 includes: (a) a pair of first slide rails 10A and 10B, each having a front end portion 10C and a rear end portion 10D, (b) a pair of second slide rails 20A and 20B, each having a front end portion 20C and a rear end portion 20D, (c) a pair of first connecting members 30A and 30C (not shown), and (d) a pair of second connecting members 30B and 30D (not shown).

In one embodiment, the front end portions 10C of the pair of the first slide rails 10A and 10B are fixedly connected to the front frame, and the rear end portion 20D of the second slide rails 20A and 20B are fixedly connected to the rear frame. The front end portions 20C of the second slide rails 20A and 20B are supported on the rear end portions 10D of the first slide rails 10A and 10B. A first end of the first connecting members 30A and 30C are fixedly connected to the rear end portions 10D of the pair of the first slide rails 10A and 10B. A second end of the first connecting members 30A and 30C are slideably connected to the pair of the second slide rails 20A and 20B. A first end of the second connecting members 30B and 30D are fixedly connected to the front end portions 20C of the pair of the second slide rails 20A and 20B. A second end of the second connecting members 30B and 30D are slideably connected to the pair of the first slide rails 10A and 10B, creating a slidable connection between the pair of the first slide rails 10A and 10B and the pair of the second slide rails 20A and 20B with the pair of the first connecting members 30A and 30C and the pair of the second connecting members 30B and 30B.

Figure 3:
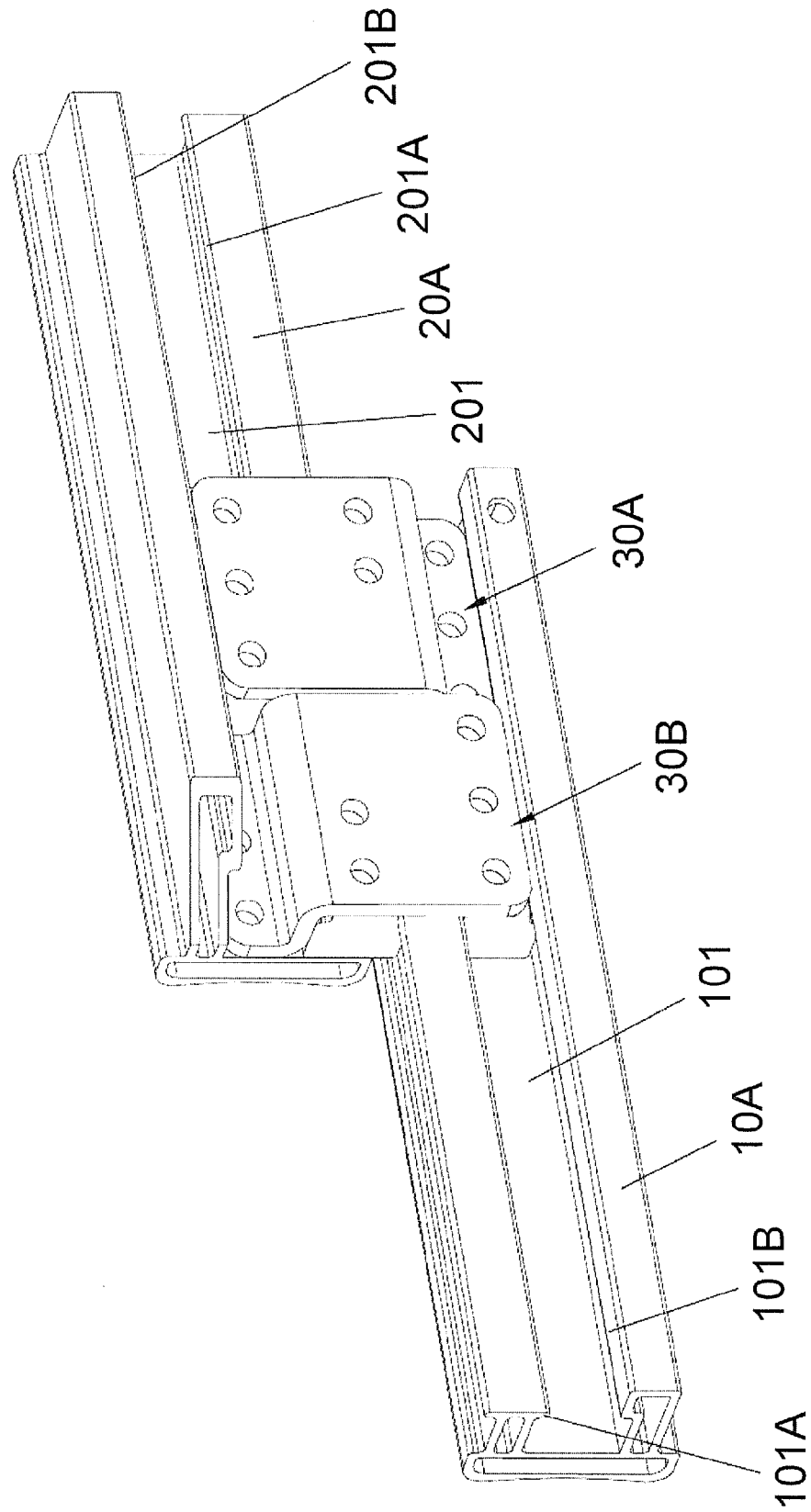
FIG. 3 shows a detailed perspective view of one side of the frame connecting and locking mechanism for the foldable motorized vehicle according to one embodiment of the present invention.

Referring to FIG. 3, a detailed perspective view of one side of the frame connecting for the foldable motorized vehicle according to one embodiment of the present invention. In one embodiment, the pair of the first slide rails 10A and 10B comprise an upper end surface 101A and a lower end surface 101B forming a first slide slot 101 therebetween. The pair of the second slide rails 20A and 20B have an upper end surface 201A and a lower end surface 201A forming a second slide slot 201 therebetween.

Figure 4:
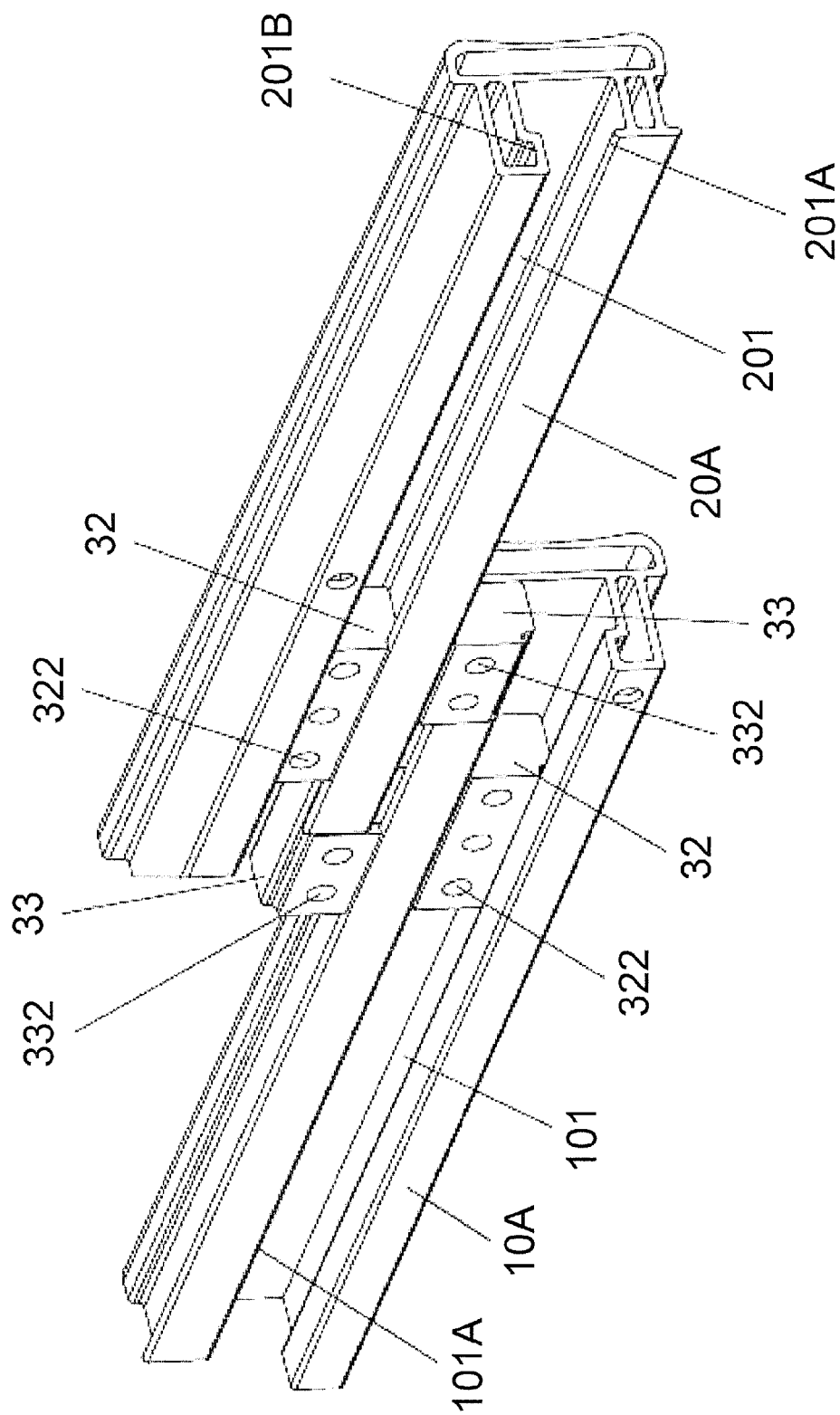
FIG. 4 shows a detailed perspective view of one side of the frame connecting and locking mechanism for the foldable motorized vehicle from a different angle and with connection plates removed according to one embodiment of the present invention.
Figure 5:
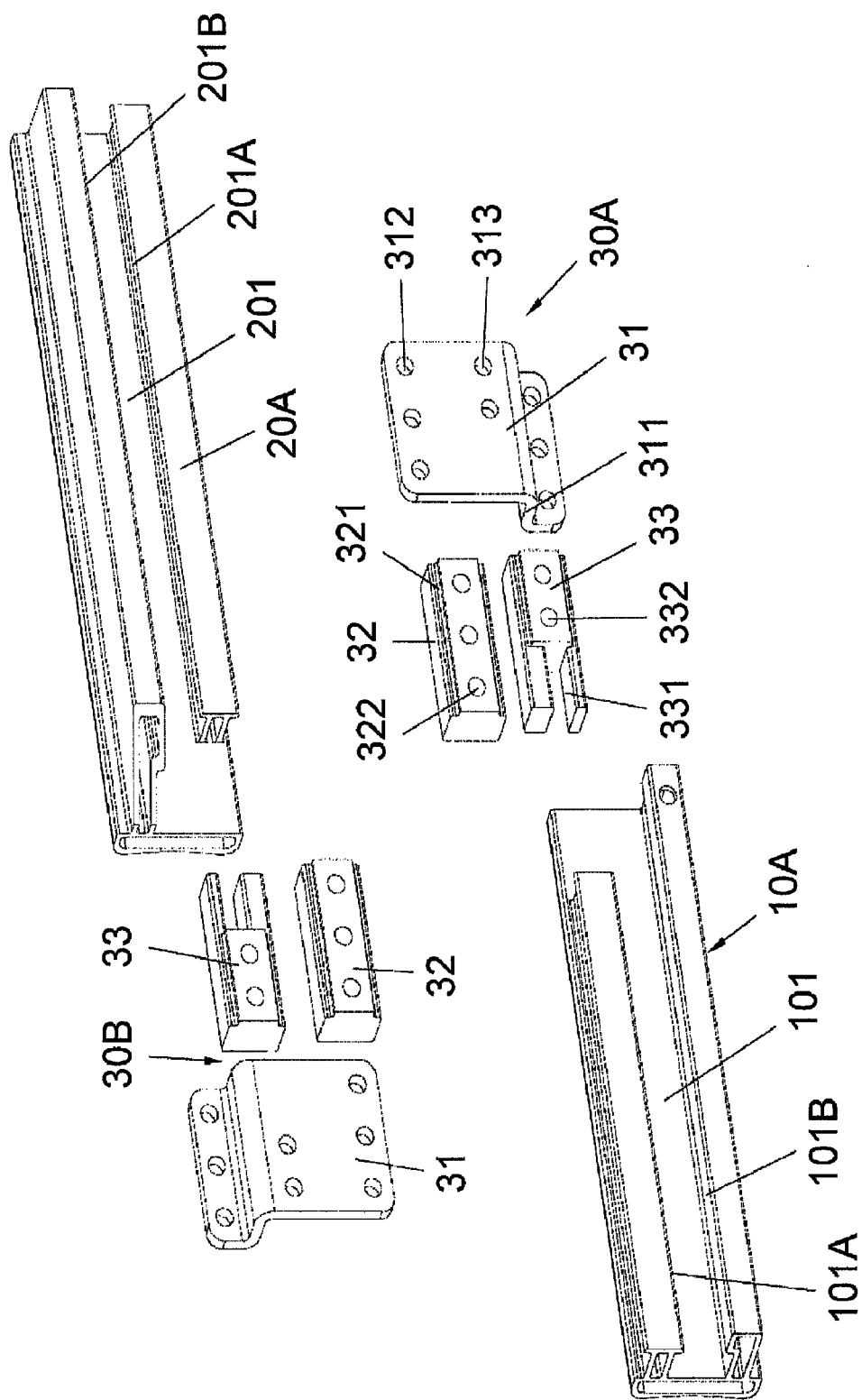
FIG. 5 shows an exploded view of one side of the frame connecting and locking mechanism for the foldable motorized vehicle according to one embodiment of the present invention.
Figure 6:
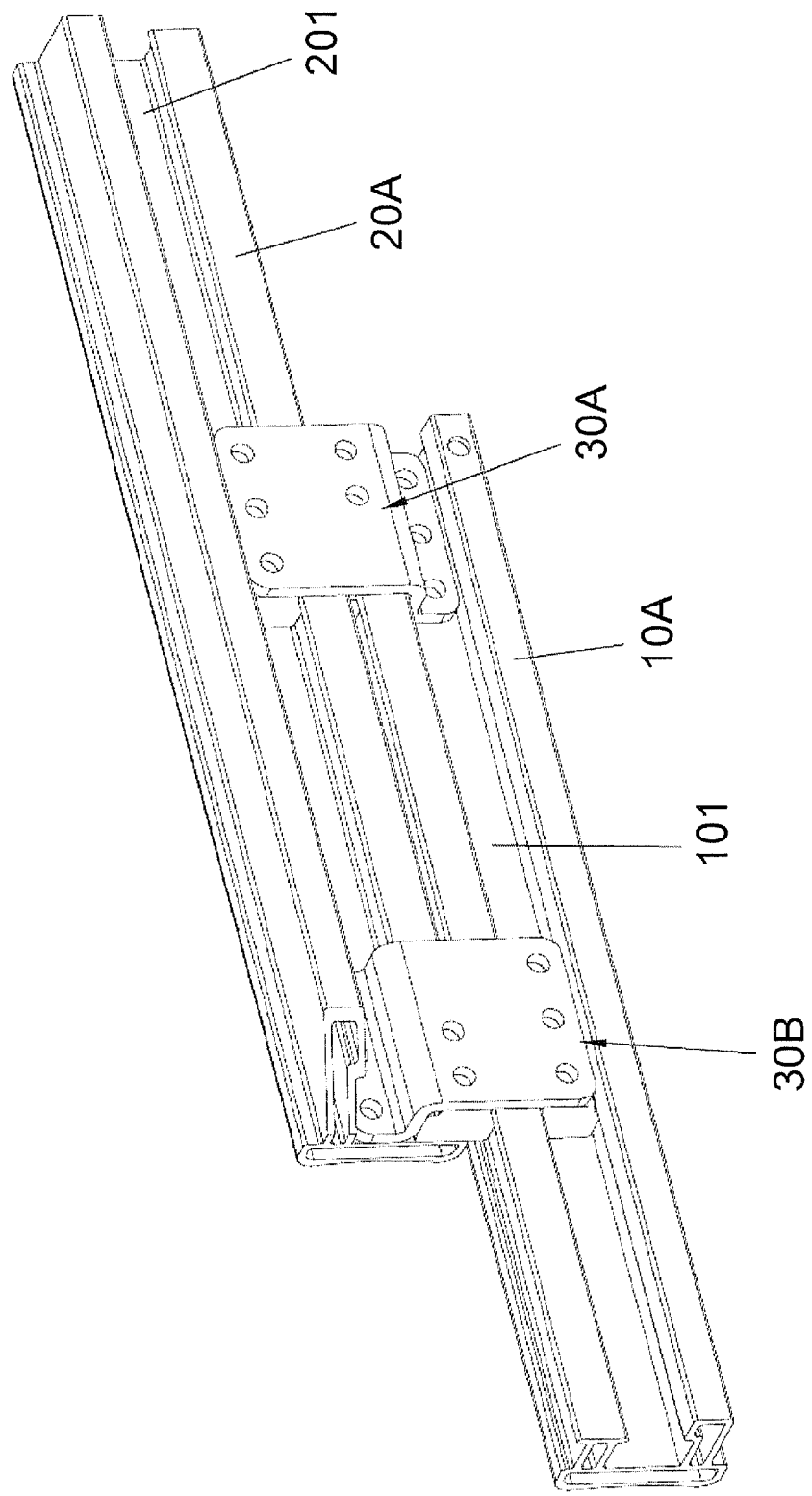
FIG. 6 shows a detailed perspective view of one side of the fully assembled frame connecting and locking mechanism for the foldable motorized vehicle according to one embodiment of the present invention.
Figure 7:
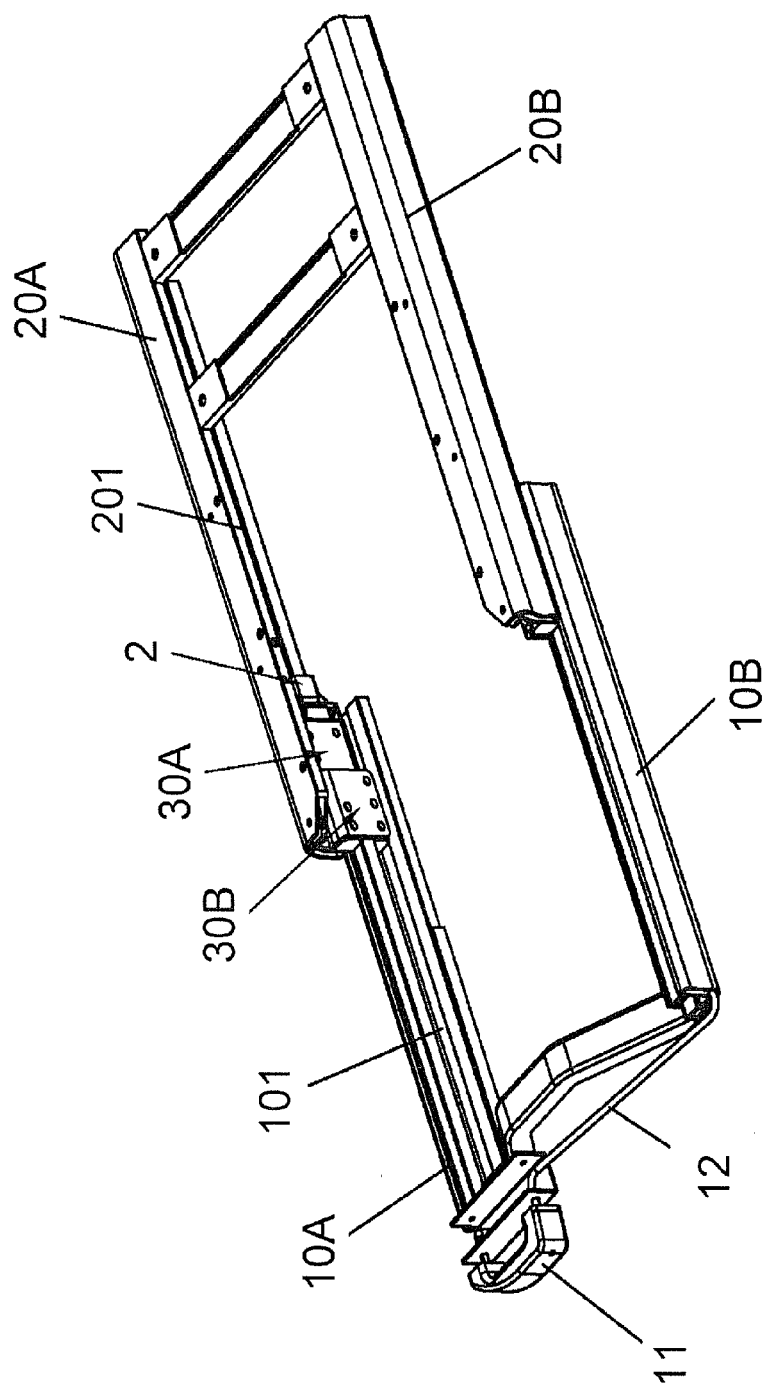
FIG. 7 shows a perspective view of fully assembled and fully unfolded frame connecting and locking mechanism for the foldable motorized vehicle according to one embodiment of the present invention.
Figure 8:
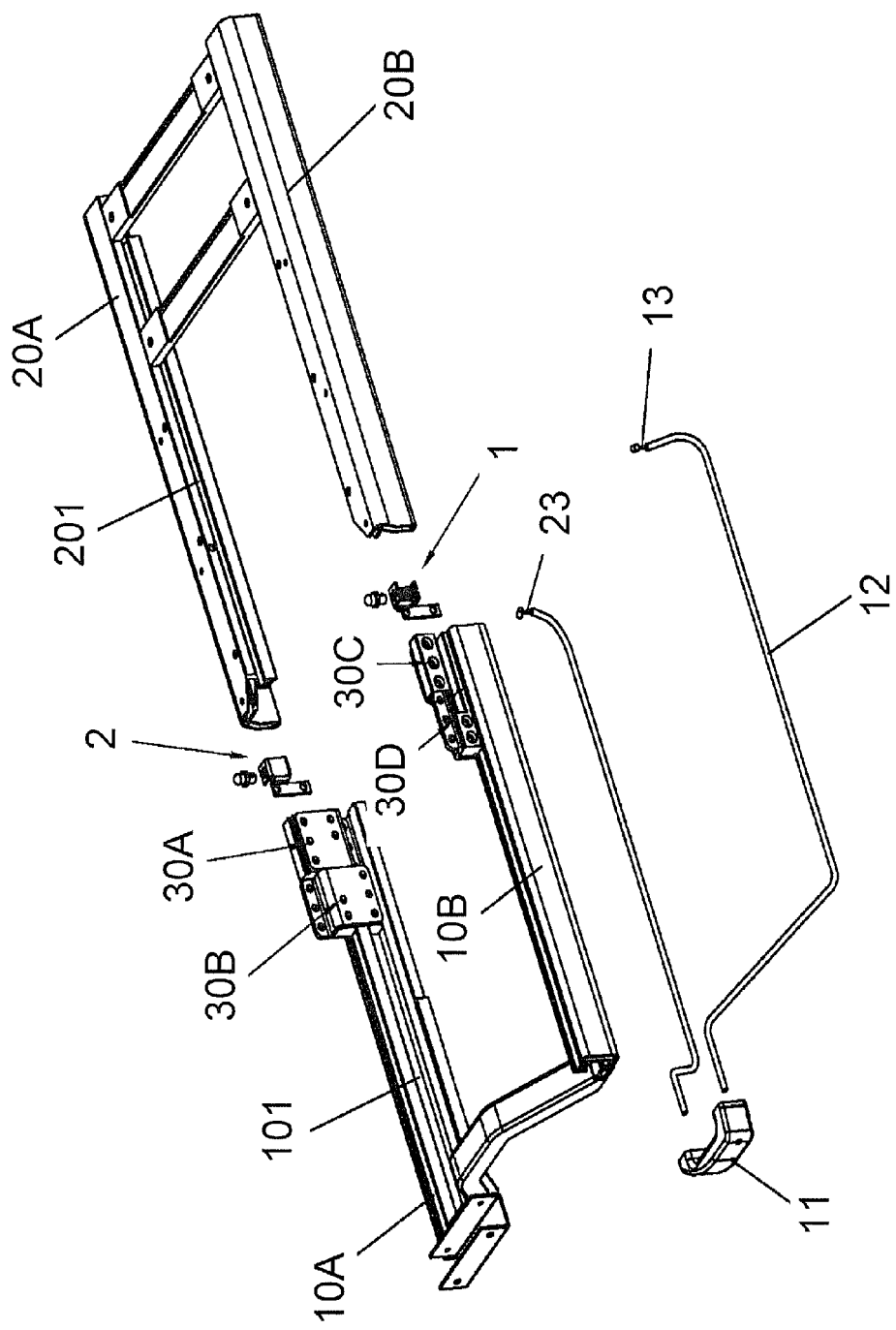
FIG. 8 shows an exploded view of the frame connecting and locking mechanism for the foldable motorized vehicle according to one embodiment of the present invention.
Figure 9:
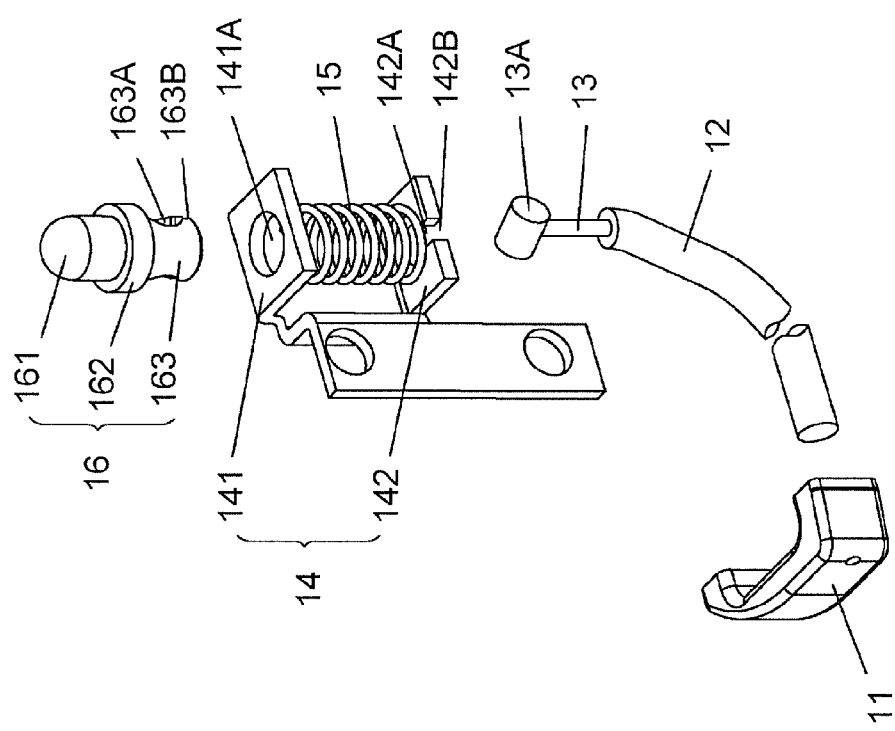
FIG. 9 shows an exploded view of the locking mechanism for the foldable motorized vehicle according to one embodiment of the present invention.

Referring now to FIGS. 4 through 6, a detailed perspective view of one side of the frame connecting mechanism, an exploded view of one side of the frame connecting mechanism, and a detailed perspective view of one side of the fully assembled frame connecting mechanism are shown respectively.

In one embodiment, the first connecting members 30A and 30C (not shown) has (a) a connecting plate 31, (b) a sliding block 32, and (c) a fixture block 33. The sliding block 32 of the first connecting members 30A and 30C (not shown) is slideably connected to the second slide slot 201 of the second slide rails 20A or 20B. The fixture block 33 of the first connecting members 30A and 30C (not shown) is mounted to the rear end portion 10D of the first slide rails 10A and 10B. The second slide rails 20A and 20B are supported by the first slide rails 10A and 10B, respectively. The sliding block 32 and the fixture blocks 33 are held by the first slide slot 101, and the connecting plate 31 is fixedly connected to the sliding block 32 and the fixture block 33 respectively.

The sliding block 32 of the second connecting members 30B and 30D (not shown) is slideably connected to the first slide slot 101 of the first slide rails 20A or 20B. The fixture block 33 of the second connecting members 30A and 30C (not shown) is mounted to the front end portion 20C of the second slide rails 20A and 20B. The sliding block 32 and the fixture block 33 are held by the second slide slot 201, and the connecting plate 31 of the second connecting members 30B and 30D (not shown) are fixedly connected to the sliding block 32 and the fixture block 33 respectively.

In one embodiment, the sliding block 32 has a plurality of installation holes 322 for mounting the sliding block 32 to the connecting plate 31, and a sliding surface 321. The fixture block 33 has a plurality of installation holes 332 for mounting the fixture block to the connecting plate 31, and a stopping slot 331. The connecting plate 31 has a plurality of installation holes 312 for mounting the sliding block 32 to the connecting plate 31, and a plurality of installation holes 313 and a mounting surface 311 for mounting the fixture block 33 to the connecting plate 31.

The sliding block 32 of the pair of the first connecting members 30A and 30C are fitted in the second slide slot 201 of the pair of the second slide rails 20A and 20B, and the sliding block 32 of the pair of the second connecting members 30B and 30D are fitted in the first slide slot 101 of the pair of the first slide rails 10A and 10B, respectively.

Referring now to FIGS. 7 through 11, a perspective view of fully assembled and fully unfolded frame connecting and locking mechanisms 1 (not shown) and 2 for the foldable motorized vehicle, an exploded view of the frame locking mechanism, an exploded view of the locking mechanism, a perspective view of a mounting base of the locking mechanism, and a perspective view of a locking pillar of the locking mechanism are shown, respectively.

In one embodiment, the frame locking mechanism 2 is mounted on the first connecting members 30A and 30C. The frame locking mechanism 2 is adapted for locking the pair of the first slide rails 10A and 10B and the pair of the second slide rails 20A and 20B, respectively.

The frame locking mechanism 2 is used to lock a first slide rail 10A and a second slide rail 20A of the foldable motorized vehicle. In one embodiment, the frame locking mechanism 2 has: (a) a handle 11 adapted for operating the locking mechanism 2, (b) a cable tube 12, (c) a cable 13 installed inside of the cable tube 12, wherein a first end of the cable 13 is connected to the handle 11, and a second end of the cable 13 includes a cylindrical metal bar 13A, (d) a mounting base 14 having a upper 141A and lower 142A clamping pieces respectively extend from upper and lower ends of the mounting base 14, and an upper through hole 141A and a lower though hole 142A with an opening 142B, (e) a compression spring 15, and (f) a stopper 16 having a rounded tip locking pillar 161, a stopping flange 162 along the perimeter of the stopper 16, a sleeve pillar 163 with a accommodation cavity 163A and an accommodation slot 163B.

Figures 10, 11:
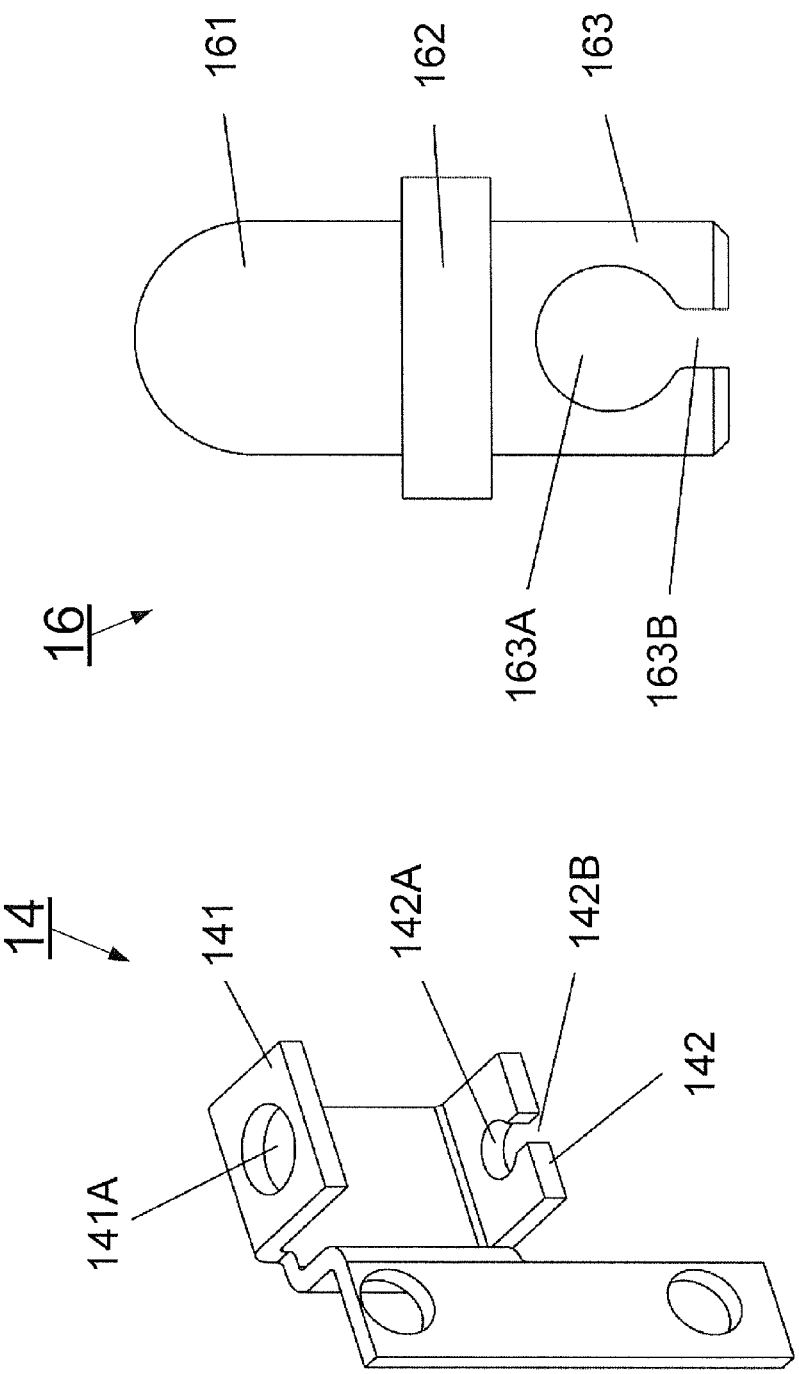
FIG. 10 shows a perspective view of a mounting base of the locking mechanism for the foldable motorized vehicle according to one embodiment of the present invention.
FIG. 11 shows a perspective view of a locking pillar of the locking mechanism for the foldable motorized vehicle according to one embodiment of the present invention.

In one embodiment, as shown in FIG. 10, the lower clamping piece 142 of the mounting base 14 is further disposed with an opening 142B, and the opening 142B is in communication with the lower through hole 142A of the mounting base 14.

In one embodiment, as shown in FIG. 11, the sleeve pillar 163 of the stopper 16 has an accommodation cavity 163A for accommodating the cylindrical metal bar 13A of the cable 13, and an accommodation slot 163B for the cable 13 to pass through, and the accommodation cavity 163A is in communication with the accommodation slot 163. The accommodation cavity 163A is a round through hole and the accommodation slot 163B is a U-shaped slot.

In one embodiment, the cable tube 12 is mounted on the first slide rail 10A of the foldable motorized vehicle. The second slide rails 20A and 20B are slidably connected to the first slide rails 10A and 10B. The mounting base 14 is mounted on the first slide rail 10A, the second slide rail 20A includes a plurality of locking holes 201C. The rounded tip locking pillar 161 of the stopper 16 passes through the upper through hole 141A of the mounting base 14 and extends into the locking holes 201C of the second slide rail 20A. The stopping flange 162 of the stopper 16 urges against an upper end of the compression spring 15. A lower end of the compression spring 15 urges against the lower clamping piece 142. The cylindrical metal piece 13A of the second end of the cable 13 is fitted in the round hole 163A and through the opening slot 163B of the stopper 16. The first end of the cable 13 passes through the compression spring 15 and the cable tube 12 and is connected to the handle 11. The handle 11 is pulled to drive the stopper 16 to exit the locking hole 201C.

In one embodiment, the frame locking mechanisms 2 are disposed on two sides of the front frame, the cables 13 are connected to the handle 11 at the same time. Pulling the handle 11 releases the frame locking mechanism 2 such that the second slide rail 20A can slide against the first slide rail 10A.

The first sliding slot 101 is opened on one side of the first slide rail 10A and the second sliding slot 201 is opened on one side of the second slide rail 20A. The first slide rail 10A is mounted with a first connecting member 30A, and the second slide rail 20A is mounted with a second connecting member 30B. Each of the first connecting member 30A and the second connecting member 30B comprises a connecting plate 31, a sliding block 32 and a fixture block 33. The sliding block 32 of the first connecting member 30A is slideably connected to the second slide rail 20A through the second sliding slot 201, the fixture block 33 of the first connecting member 30A is fitted to a rear end portion of the first slide rail 10A. The sliding block 32 of the second connecting member 30B is slideably connected to the first slide rail 10A through the first sliding slot 101. The fixture block 33 of the second connecting member 30B is fitted to a front end portion of the second slide rail 20A, respectively, such that the first slide rail 10A and the second slide rail 20A can slide against each.

In one embodiment, the mounting base 14 is mounted on the first connecting member 30A.

The rounded tip locking pillar 161 passes through the upper through hole 141A of the mounting base 14 and extends into a locking holes 201C of the second slide rail 20A. One end of the compression spring 15 is sleeved on the sleeve pillar 163 and pushes against one side of the stopping flange 162. The other end of the compression spring 15 is placed on the inside surface of the lower clamping piece 142. The other side of the stopping flange 162 pushes against the upper clamping piece 141.

Figure 12A:
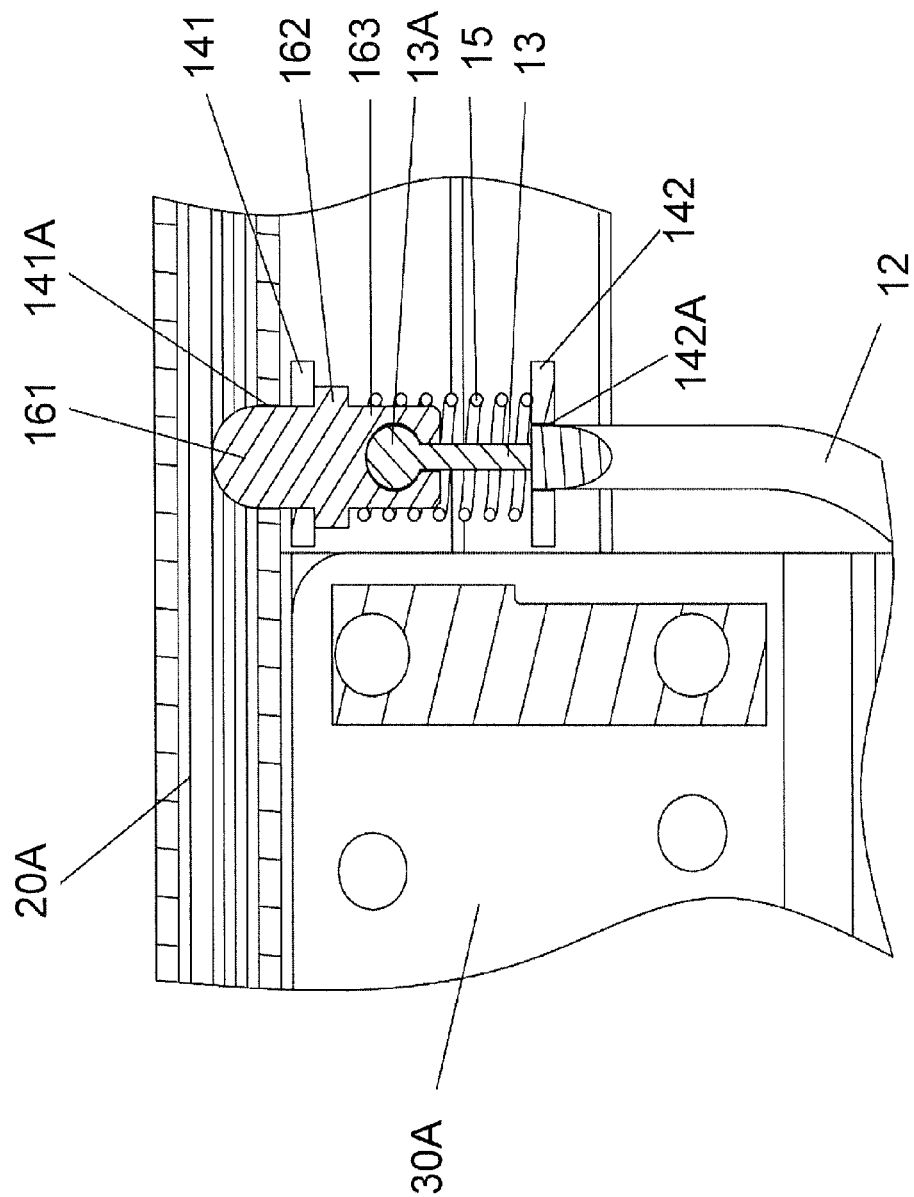
FIG. 12A shows a sectional view of a locking pillar of the locking mechanism for the foldable motorized vehicle in locking position.
Figure 12B:
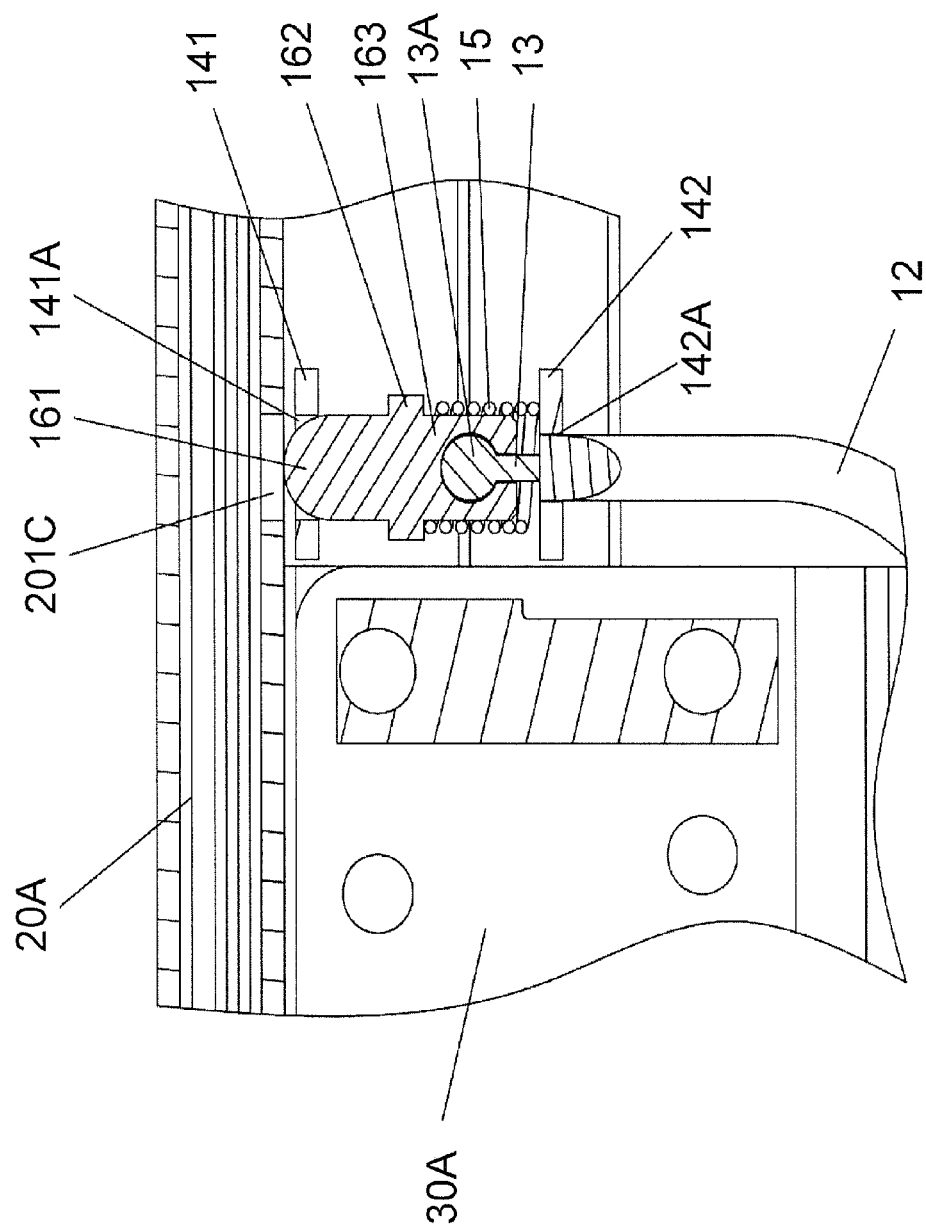
FIG. 12B shows a sectional view of the locking pillar of the locking mechanism for the foldable motorized vehicle in unlocked position according to one embodiment of the present invention.

Referring now to FIGS. 12A and 12B, sectional views of a locking pillar of the locking mechanism for the foldable motorized vehicle in locking position (12A), and in unlocked position (12B) are shown respectively, according to one embodiment of the present invention.

The first slide rail 10A and the second slide rail 20A are slidably interconnected, and the first and second frame locking mechanisms 1 (not shown), 2 are mounted on the first slide rail 10A. In a locked state (as shown in FIG. 12A), an resilient force produced by the compression spring 15 is applied on the stopping flange 162 to push the stopper 16 upward, and the rounded tip locking pillar 161 on the top end of the stopper 16 passes through the upper through hole 141A to enter the locking hole 201C of the second slide rail 20A. At this time, the stopping flange 162 urges against the upper clamping piece 141. The cable 13 is tightened and pulls the handle 11 hard to make the handle 11 urge against an end portion of the cable tube 12. When the first frame locking mechanism 1 is in a locked state, the second frame locking mechanism 2 is also in a locked state.

When the relative positions of the first slide rail 10A and the second slide rail 20A need to be adjusted, the handle 11 is pulled to move away from the cable tube 12. The cables 13 and 23 of the first and second frame locking mechanisms 1, 2 are pulled simultaneously. The cable 13 of the first frame locking mechanism 1 passes through the cable tube 12, and pulls the stopper 16 through the connector 13A, so that the stopper 16 moves downward, and the stopping flange 162 departs from the upper clamping piece 141 and the compression spring 15 is compressed. At this time, the rounded tip locking pillar 161 moves downward to depart from the locking hole 201C. When The rounded tip locking pillar 161 completely departs from the locking hole 201C but still passes through the upper through hole 141A, the first frame locking mechanism 1 is in an unlocked state. The unlocking process of the second frame locking mechanism 2 is completely the same as that of the first frame locking mechanism 1, and the two processes are implemented simultaneously.

During the unlocking process, the handle 11 is kept in a stretched state, and at this time, the front frame is unlocked relative to the rear frame, so that the front frame can extend or retract. After an appropriate position is achieved by adjusting, another locking hole 201C of the second slide rail 20A is aligned with the upper through hole 141A, the handle 11 is released, and under a restoring force of the compression spring 15, the stopping flange 162 is pushed upward, so that the stopper 16 moves upward and extends into the locking hole 201C of the second slide rail 20A. Meanwhile, the stopper 16 drives the cable 13 to pull the handle 11, so that the handle 11 is drawn close to the end portion of the cable tube 12. When the stopping flange 162 urges against the upper clamping piece 141, the handle 11 urges against the end portion of the cable tube 12. At this time, the first and second frame locking mechanisms 1, 2 are in the locked state, so that the front frame and the rear frame are locked.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A frame connecting mechanism for connecting a front frame and a rear frame of a foldable motorized vehicle, comprising:
   (a) a pair of first slide rails, each having a front end portion and a rear end portion;
   (b) a pair of second slide rails, each having a front end portion and a rear end portion;
   (c) a pair of first connecting members, each having a first end and a second end; and
   (d) a pair of second connecting members, each having a first end and a second end,
   wherein the front end portions of the pair of the first slide rails are fixedly connected to the front frame, the rear end portion of the second slide rails are fixedly connected to the rear frame, the front end portions of the second slide rails are supported on the rear end portions of the first slide rails, the first ends of the first connecting members are fixedly connected respectively to the corresponding rear end portions of the pair of the first slide rails, the second ends of the first connecting members are slideably connected respectively to the pair of the second slide rails, a first end of the second connecting members are fixedly connected to the front end portions of the pair of the second slide rails, and the second ends of the second connecting members are slideably connected respectively to the pair of the first slide rails, to form a slidable connection between the pair of the first slide rails and the pair of the second slide rails with the pair of the first connecting members and the pair of the second connecting members.

2. The frame connecting mechanism according to claim 1, wherein the pair of the first slide rails comprise an upper end surface and a lower end surface forming a first slide slot therebetween.

3. The frame connecting mechanism according to claim 2, wherein the pair of the second slide rails comprise an upper end surface and a lower end surface forming a second slide slot therebetween.

4. The frame connecting mechanism according to claim 3, wherein each of the first connecting members comprises a connecting plate, a sliding block and a fixture block, wherein the sliding block is slideably connected to the first slide rails, the fixture block is fitted to the rear end portion of the first slide rails, the second slide rails are supported by the first slide rails, respectively, and the sliding block and the fixture blocks are held by the first slide slot, and the connecting plate is fixedly connected to the sliding block and the fixture block respectively.

5. The frame connecting mechanism according to claim 4, wherein each of the second connecting members comprise a connecting plate, a sliding block and a fixture block, wherein the sliding block is slideably connected to the second slide rails, the fixture block is fitted to the front end portion of the second slide rails, and the sliding block and the fixture block are held by the second slide slot, and the connecting plate of the second connecting members are fixedly connected to the sliding block and the fixture block respectively.

6. The frame connecting mechanism according to claim 5, wherein the sliding block is formed with a plurality of installation holes for mounting the sliding block to the connecting plate, and a sliding surface, the fixture block is formed with a plurality of installation holes for mounting the fixture block to the connecting plate, and a stopping slot, and the connecting plate is formed with a plurality of installation holes for mounting the sliding block to the connecting plate, and a plurality of installation holes and a mounting surface for mounting the fixture block to the connecting plate.

7. The frame connecting mechanism according to claim 6, wherein the sliding block of the pair of the first connecting members are fitted in the second slide slot of the pair of the second slide rails, and the sliding block of the pair of the second connecting members are fitted in the first slide slot of the pair of the first slide rails, respectively.

8. The frame connecting mechanism according to claim 7, further comprising a locking member, wherein the locking member is mounted on the first connecting members, and the locking member is adapted for locking the first slide rails and the second slide rails, respectively.

9. A foldable motorized vehicle comprising the frame connecting mechanism according to claim 1.

10. A frame locking mechanism for locking a first slide rail and a second slide rail of a foldable motorized vehicle, comprising:
(a) a handle;
(b) a cable tube;
(c) a cable installed inside of the cable tube, wherein a first end of the cable is connected to the handle, and a second end of the cable includes a cylindrical metal bar;
(d) a mounting base having a upper and lower clamping pieces that respectively extend from upper and lower ends of the mounting base, and an upper through hole and a lower though hole each with an opening;
(e) a compression spring; and
(f) a stopper having a rounded tip locking pillar, a stopping flange along the perimeter of the stopper, a sleeve pillar with a accommodation cavity and an accommodation slot,
wherein in use the cable tube is mounted on the first slide rail of the foldable motorized vehicle, the second slide rail is slidably connected to the first slide rail, the mounting base is mounted on the first slide rail, the second slide rail includes a plurality of locking holes, the rounded tip of the stopper passes through the upper through hole of the mounting base and extends into the locking hole of the second slide rail, the stopping protrusion of the stopper urges against an upper end of the compression spring, a lower end of the compression spring urges against the lower clamping piece, the cylindrical metal bar of the second end of the cable is fitted in the round hole and through the opening slot of the stopper, and the first end of the cable passes through the compression spring and the cable tube and is connected to the handle, and wherein when the handle is pulled, the stopper is driven by the handle to exit the locking hole.

11. The frame locking mechanism according to claim 10, wherein the frame locking mechanisms are disposed on two sides of a front frame respectively, and the cables are connected to the handle at the same time, and the pulling the handle releases the frame locking mechanism such that the second slide rail can slide against the first slide rail.

12. The frame locking mechanism according to claim 11, wherein a first sliding slot is opened on one side of the first slide rail, a second sliding slot is opened on one side of the second slide rail, the first slide rail is mounted with a first connecting member, the second slide rail is mounted with a second connecting member, each of the first connecting member and the second connecting member comprises a connecting plate, a sliding block and a fixture block, the sliding block of the first connecting member is slideably connected to the second slide rail through the second sliding slot, the fixture block of the first connecting member is fitted to a rear end portion of the first slide rail, the sliding block of the second connecting member is slideably connected to the first slide rail through the first sliding slot, the fixture block of the second connecting member is fitted to a front end portion of the second slide rail, respectively, such that the first slide rail and the second slide rail can slide against each.

13. The frame locking mechanism according to claim 12, wherein the mounting base is mounted on the first connecting member.

14. The frame locking mechanism according to claim 13, wherein the rounded tip locking pillar passes through the upper through hole of the mounting base and extends into a locking holes of the second slide rail, one end of the compression spring is sleeved on the sleeve pillar and pushes against one side of the stopping flange, the other end of the compression spring is placed on the inside surface of the lower clamping piece, and the other side of the stopping flange pushes against the upper clamping piece.

15. The frame locking mechanism according to claim 14, wherein sleeve pillar of the stopper comprises an accommodation cavity for accommodating the cylindrical metal bar of the cable, and an accommodation slot for the cable to pass through, and the accommodation cavity is in communication with the accommodation slot.

16. The frame locking mechanism according to claim 15, wherein the accommodation cavity is a round through hole, and the accommodation slot is a U-shaped slot.

17. The frame locking mechanism according to claim 16, wherein the lower clamping piece of the mounting base is further disposed with an opening, and the opening is in communication with the lower through hole of the mounting base.

18. A foldable motorized vehicle comprising the frame locking mechanism according to claim 10.

19. A foldable motorized vehicle, comprising:
(a) a front frame;
(b) a rear frame;
(c) a frame connecting mechanism for connecting the front frame and the rear frame, comprising:
  a pair of first slide rails, each having a front end portion and a rear end portion;
  a pair of second slide rails, each having a front end portion and a rear end portion;
  a pair of first connecting members, each having a first end and a second end; and
  a pair of second connecting members, each having a first end and a second end,
  wherein the front end portions of the pair of the first slide rails are fixedly connected to the front frame, the rear end portion of the second slide rails are fixedly connected to the rear frame, the front end portions of the second slide rails are supported on the rear end portions of the first slide rails, the first ends of the first connecting members are fixedly connected respectively to the rear end portions of the pair of the first slide rails, the second ends of the first connecting members are slideably connected respectively to the pair of the second slide rails, the first ends of the second connecting members are fixedly connected respectively to the front end portions of the pair of the second slide rails, the second ends of the second connecting members are slideably connected respectively to the pair of the first slide rails, to form a slidable connection between the pair of the first slide rails and the pair of the second slide rails with the pair of the first connecting members and the pair of the second connecting members; and
(d) a frame locking mechanism for locking the pair of the first slide rails and the pair of the second slide rails, respectively, comprising:
  a handle;
  a cable tube;
  a cable installed inside of the cable tube, wherein a first end of the cable is connected to the handle, and a second end of the cable includes a cylindrical metal bar;
  a mounting base having a upper and lower clamping pieces that respectively extend from upper and lower ends of the mounting base, and an upper through hole and a lower though hole each with an opening;
  a compression spring; and
  a stopper having a rounded tip locking pillar, a stopping flange along the perimeter of the stopper, a sleeve pillar with a accommodation cavity and an accommodation slot,
  wherein in use the cable tube is mounted on the first slide rail of the foldable motorized vehicle, the second slide rail is slidably connected to the first slide rail, the mounting base is mounted on the first slide rail, the second slide rail includes a plurality of locking holes, the rounded tip of the stopper passes through the upper through hole of the mounting base and extends into the locking hole of the second slide rail, the stopping protrusion of the stopper urges against an upper end of the compression spring, a lower end of the compression spring urges against the lower clamping piece, the cylindrical metal bar of the second end of the cable is fitted in the round hole and through the opening slot of the stopper, and the first end of the cable passes through the compression spring and the cable tube and is connected to the handle, and wherein when the handle is pulled, the stopper is driven by the handle to exit the locking hole.

\* \* \* \* \*